United States Patent
Innala et al.

(10) Patent No.: US 7,444,862 B2
(45) Date of Patent: Nov. 4, 2008

(54) WEB TENSION PROFILE MEASURING METHOD AND ROLL APPLYING THE SAME

(75) Inventors: Matti Innala, Järvenpää (FI); Jorma Kinnunen, Helsinki (FI); Jussi Koskelainen, Helsinki (FI); Tatu Pitkänen, Järvenpää (FI); Petteri Lannes, Jokela (FI); Markus Nylund, Helsinki (FI); Marko Tiilikainen, Kellokoski (FI); Jyrki Saloniemi, Muurame (FI); Reijo Huuskonen, Tikkakoski (FI)

(73) Assignee: Metso Paper, Inc., Belsinki (FI)

( * ) Notice: Subject to any disclaimer, the term of this patent is extended or adjusted under 35 U.S.C. 154(b) by 0 days.

(21) Appl. No.: 11/778,401

(22) Filed: Jul. 16, 2007

(65) Prior Publication Data

US 2008/0034880 A1    Feb. 14, 2008

Related U.S. Application Data

(63) Continuation of application No. PCT/FI2006/050027, filed on Jan. 17, 2006.

(30) Foreign Application Priority Data

Jan. 17, 2005   (FI)   ................................... 20055019

(51) Int. Cl.
     *G01L 5/04*     (2006.01)

(52) U.S. Cl. ........................................................ 73/159
(58) Field of Classification Search .................... 73/159
See application file for complete search history.

(56) References Cited

U.S. PATENT DOCUMENTS

| | | | | |
|---|---|---|---|---|
| 3,763,701 | A * | 10/1973 | Wright et al. | ........... 73/862.474 |
| 5,405,561 | A * | 4/1995 | Dais et al. | ................... 264/40.1 |
| 5,592,875 | A | 1/1997 | Moschel | |
| 5,699,729 | A | 12/1997 | Moschel | |
| 6,123,770 | A * | 9/2000 | Koskinen et al. | ............. 118/110 |
| 6,568,285 | B1 * | 5/2003 | Moore et al. | .............. 73/862.55 |
| 6,853,927 | B2 * | 2/2005 | Noe et al. | ....................... 702/41 |
| 2007/0163318 | A1 | 7/2007 | Mücke et al. | |

FOREIGN PATENT DOCUMENTS

FI          113804 B       6/2004

* cited by examiner

*Primary Examiner*—Max Noori
(74) *Attorney, Agent, or Firm*—Alston & Bird LLP (57) ABSTRACT

A method and a roll for measuring a tension profile is provided. The roll has planted on its surface a spirally helical pressure-sensitive film sensor, such as an EMFi pressure-sensitive film sensor, which makes contact with a web obliquely and which, co-directionally with the web, has a measuring range which is substantially equal to or shorter than a web overlap angle when the roll is used for measuring a lateral tension profile of the web.

16 Claims, 4 Drawing Sheets

WEB TENSION PROFILE MEASURING METHOD AND ROLL APPLYING THE SAME

CROSS-REFERENCE TO RELATED APPLICATIONS

This is a continuation of PCT/FI2006/050027, filed Jan. 17, 2006, which International Application was published by the International Bureau in English on Jul. 20, 2006, and also claims the benefit of Finnish Priority Application No. 20055019, filed Jan. 17, 2005, all of which are incorporated by reference herein in their entirety.

BACKGROUND OF THE INVENTION

Field of the Invention

The application relates to measuring the tension profile of a stretching fibrous web running past a rotating roll, such as a stretching paper, board, tissue or the like fibrous material, such as the dewatering or drying fabric of a paper machine. The invention is also applied in the context of a stretching fibrous web in paper, board or tissue making machines or in further processing machines for papers, such as guillotines or printing presses.

BRIEF SUMMARY OF THE INVENTION

It is an object of the invention to enable measuring a web or the like, for example a drying felt, for its CD-profile (cross-directional profile) from a running machine by means of a simple measuring system. The use of helical film sensors planted on a roll surface is known for example from the patent FI 113804B. The purpose of this invention is to improve measuring accuracy as compared to the use of a spirally shaped sensor described in the cited patent and to enable a sufficiently precise measurement of the web tension profile in a manner that is simpler than using several adjacent sensors as set forth in the cited application and to attain a resolution which is better than what is accomplished by a spiral sensor described in the cited publication.

The invention uses preferably the EMFi-film, which is a cellular plastic film, having a permanent electrical charge and operating the same way as a piezoelectric sensor. The voltage signal produced by an EMFi-film depends on a pressure change in the entire element such that, as the pressure changes, each segment of the element produces an equal change in the output voltage. Thus, the short-duration voltage measured with a high-impedance amplifier is an integral for the pressures of an entire sensor. The sensor operates as a dynamic sensor, which does not provide a constant result in long-duration compression, but the direct-voltage component applied across the sensor changes as a result of current losses. Consequently, the sensor only works when it experiences pressure changes. A device of the invention can also take the form of some other sensor, for example a resistive pressure-sensitive film, a piezoelectric PVDF-film (polyvinylidene fluoride film) or a PLL-film (piezo-pyroluminescent film). However, the subsequent applications are only discussed in reference to the EMFi-film. As a technical measuring instrument, the EMFi-film is inexpensive and highly suitable for a service according to the invention.

The helical sensor described in the above-cited patent, when implemented with an EMFi-film, serves in measuring a dynamic load, i.e. it observes a pressure change occurring in the film, such that the compression of each point of the film produces a charge which is perceived as a change in the film voltage as the voltage applied across the film is measured with a high-impedance amplifier. The degree of change can be calculated by differentiation. Alternatively, the change of compression at any given point is directly perceivable as a change of the current rate, when using a low-impedance amplifier, in practice a current-voltage converter. A third option is conducting a measurement with a charge amplifier. In addition, the voltage and charge amplifiers should preferably be set to zero by short-circuiting the sensor and/or intra-amplifier capacitors at the start of each measurement. A preferred time for zeroing is when the sensor is in a totally non-compressed state. If the time spent for a measurement is only the period when a sensor is covered by an overlap angle, the sensor can be subjected to zeroing all the time except when measuring is going on. The choice of an amplifier type depends primarily on the type of interferences and requirements regarding sensitivity and precision.

Other prior art publications also present a considerable number of helical sensors for measuring pressure from a roll. These take advantage of the fact that the contact area in a nip subjected to a pressure to be measured or the overlap angle is small with respect to the overall length of a sensor. It is often just a very small portion of the sensor which is under pressure. Thus, the voltage provided by a sensor is directly proportional to the pressure and the portion under pressure sweeps across the entire web width during a single revolution of the spirally shaped sensor. However, in the process of measuring web tension, it was discovered that this approach does not work, it being actually preferable to have as long a web overlap angle as possible and a sensor concealment not exceeding the overlap angle, whereby the sensor winds itself under the overlapping web until it is totally concealed thereby and after this the sensor emerges from under the overlap until it is once more totally clear of the concealment. Thus, if the pressure remains constant at each point of a sensor, while the sensor is under the overlap, the only point of varying pressure will be at the leading and trailing point of a web as the web is winding to cover the sensor. The situation is generally like this, unless the actual roll to be measured causes irregular slackening and tightening of the web.

A solution according to a preferred embodiment of the invention has a further objective to provide a method of measuring a nip pressure indirectly by measuring a nip-influenced change in the tension profile. Another objective of the preferred embodiment is to provide an easy-to-retrofit and -replace sensor.

Since the EMFi-sensor is by nature a change-measuring or dynamic sensor, it does in fact measure a change instead of an absolute rate of pressure over a long run. This enables, in a very favorable manner, a measurement of the web tension having an effect on a roll which has a long overlap length. Being responsive to a change, the EMFi-sensor does not provide a response from the area of a constant pressure, the tension-measuring roll being preferably low in friction and having a running speed equal to that of the web, which is why no tightening or slackening of the web takes place over the roll itself. Thus, only the leading or trailing edge of a sensor contacting the web provides a response, on the basis of which it is possible to determine the web tension at each contact point of a helical sensor. The contact point of a sensor can be calibrated for example by measuring the response of a sensor itself and by identifying the first contact of the sensor with the web or by having a timing signal provided by the sensor indicate the position of a roll. An external sensor is also necessary for zeroing the sensor's charge when the latter is in a static mode, i.e. totally in compression or totally clear of web compression.

Generally, a roll used for measuring the tension of a paper or fibrous web carries a smooth coating and the web-entrained air produces a thin undisturbed air foil functional as a bearing layer between the web and the roll. Hence, in practice, the tension of a web does not change to any significant degree over the course of a roll, as the roll is not capable of applying any lengthwise force on the web. Therefore, it is generally a very good approximation to contemplate that a signal change, as the sensor proceeds through an inlet throat as it goes in under an overlap angle, is only a result of a pressure change caused by the inlet throat itself until the moment that the sensor comes out from under the overlap angle at the trailing edge. This change of pressure is directly a function of the roll diameter and the web tension, and the pressure remains constant for the entire time that the sensor spends under the overlap angle. Thus, the invention is characterized in that the sensor as a whole fits under the overlap angle and that the sensor, over the course of each revolution, assumes also a totally unrestrained condition not compressed by a web or the like.

The invention is best functional with stretching fibrous webs, which are relatively low in tension and have a high web speed. A metal belt web, for example, does not provide a lubricating air foil between the web and the roll, whereby the roll momentum causes measuring error, even a lightly bearing-mounted free-rotating roll, resulting in web-directed forces in the event that the belt's length varies in different sections. Also, the fibrous web lacks rigidity and there may exist forces resulting from web shaping, like in the case of a rollable metal web.

Surprisingly, a preferred measuring geometry in the measurement of web tension includes in fact a wide overlap angle and a pressure-sensitive film sensor almost equal in length to the overlap angle in pressure measuring service. In addition, because a pressure-sensitive film sensor keeps measuring an integral of its entire surface area, it is preferred to have a narrow sensor, with the result that a small width on the roll surface causes voltage variation between the leading and trailing edges and a lateral resolution is high. This is easy to carry out by way of an EMFi-film laid in a spiral configuration.

BRIEF DESCRIPTION OF THE SEVERAL VIEWS OF THE DRAWING(S)

The following description relates to an embodiment of the invention and measuring results obtained thereby.

DETAILED DESCRIPTION OF THE INVENTION

Figure 1:
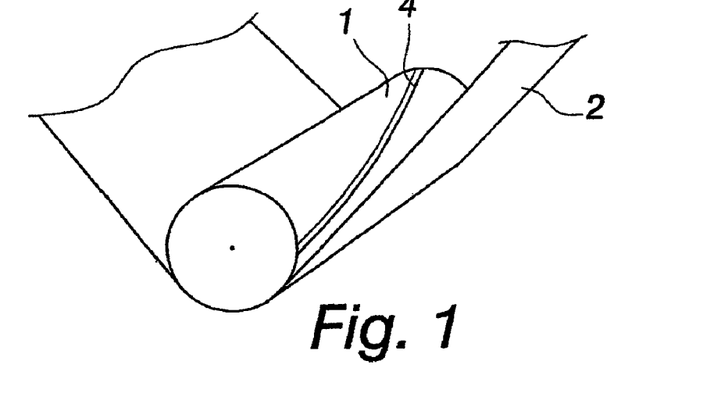
FIG. 1: a perspective view of a roll according to the invention.
Figure 2:
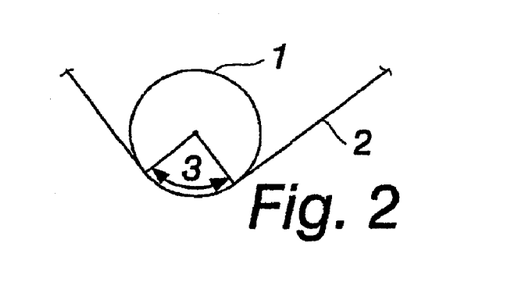
FIG. 2: the roll of FIG. 1 in an end view.
Figure 3:
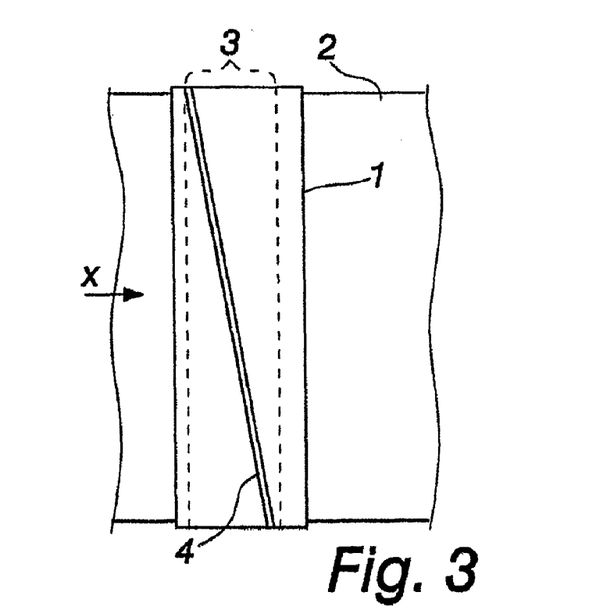
FIG. 3: the arrangement of FIGS. 1 and 2 in a plan view.

FIGS. 1-3 illustrate a sensor 4, which is planted on a roll 1 or preferably buried under a coating of the roll 1 and which is a segment of a spiral helix. The sensor has a helical pitch in the running direction of a web 2 which in the illustrated example is slightly less than an overlap angle 3. The overlap angle refers to a section of the roll, which is in contact with the web and over which section the web produces a tension-defined constant pressure on each segment of the roll. In FIG. 1, the sensor is depicted outside the overlap angle, in FIG. 3 the sensor is depicted completely within the overlap angle 3.

A protection groove can be prepared for the sensor 4 for planting the sensor therein. Thus, the sensor is preferably more or less flush with the surrounding surface. A pressure produced by the web 2 is transmitted to the sensor 4 by a possibly overlaid coating. The sensor itself is fixed for example by sizing or taping. The sensor must be planted on a smooth surface and the overlaid coating must be consistent in quality. Because the sensor is quite thin, its planting without a protection groove is possible. The overlaid coating can be ground or flattened for smoothness to avoid the formation of a bulge on the roll surface coincident with the sensor.

Thus, over the course of each roll revolution, the sensor is momentarily completely within the overlap angle 3 and hence in its entirety exposed to the web pressure. If the sensor had a helical pitch in excess of the overlap angle, the tension at the web's 2 edge would go unmeasured. Thus, at the moment when both ends of the sensor coincide with boundaries of the overlap angle 3, the sensor 4 is not measuring a lateral profile as the changes of the sensor's 4 ends offset each other. It should be noted that a very slight overstep of the sensor 4 with respect to the overlap angle 3 does not necessarily impede practical implementation, and a slight overstep should be regarded as a solution within the scope of the present invention. With regard to measuring resolution, a sensor exactly equal in length to the overlap angle provides the best resolution. A sensor shorter than the overlap angle is momentarily completely within the overlap angle and the lateral resolution is poorer because of a quicker concealment.

Figure 4A:
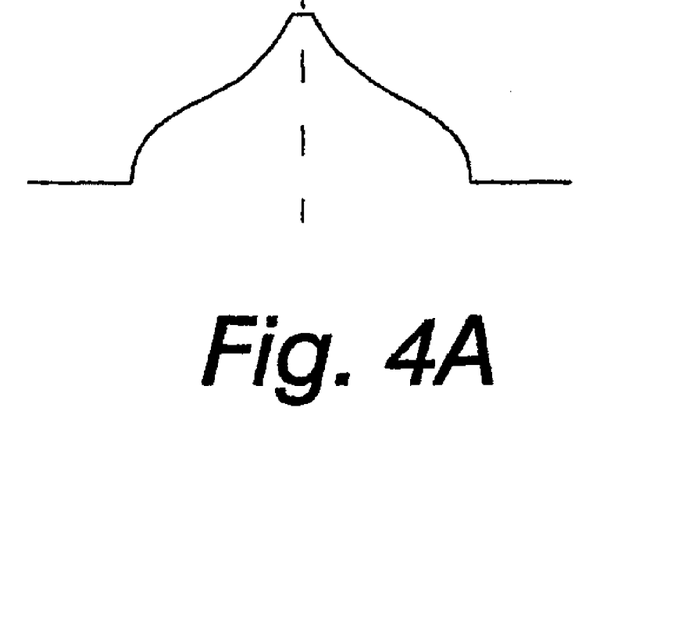
FIG. 4A: a sensor-emitted signal as a function of a helical pitch.
Figure 4B:
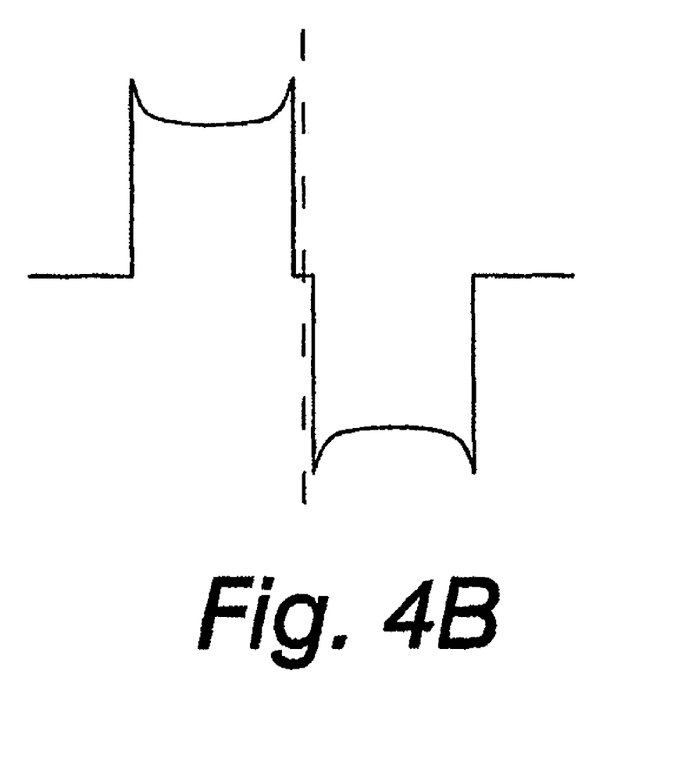
FIG. 4B: a derivative of the signal in FIG. 4A with respect to a helical pitch.

FIGS. 4A and 4B illustrate a signal produced by a measuring sensor in the condition that the edges of a web are more tense than the mid-section. This condition is typically a result of the web edges drying at a faster rate than the mid-section. FIGS. 4A and 4B are sketched to the same scale of helical pitch, i.e. with a common x-axis. In FIG. 4A the vertical axis comprises a pressure-reflecting voltage, and in FIG. 4B the vertical axis comprises a derivative of said voltage with respect to a helical pitch (dV/dx). The measurement 4A is effected with a high-impedance voltage amplifier and the y-axis represents a voltage produced by the sensor. The rising rib of FIG. 4A is created as the sensor 4 goes in under the trailing edge. The rising rib has its leading and trailing ends rising sharper than the mid-section of the rising rib. This is visible in the derivative function or tension profile 4B in the form of rising edges. A pressure, or more correctly a change of pressure, is being measured by the sensor over its entire area, such that a change in each section has the same weighting value. In the area outside the overlap angle the sensor is not subjected to forces, within the range of the overlap angle the forces are constant since the web tension and the web-tightening radius of curvature remain constant. Therefore, a voltage change is solely due to a change caused by the sensor's 4 leading or trailing edge and the change can be worked out by differentiating the function 4A. The derivative function 4B is a direct representation of the lateral web tension profile. The ultimate numerical tension profile is obtained by scaling the profile by an overall width and an overall tension. The scaled profile works, as subsequently described, also in measuring an absolute tension profile, and the calculation of a lateral integral for the profile yields also the overall tension, in the case of the narrow web 2 information being obtained at the same time, regarding also the width and location of the web.

A graph consistent with the same FIG. 4B is also produced by using a current amplifier for receiving a signal of the sensor 4. Hence, in this case, a change of the sensor's 4 edge is a direct reason for a current change. Usually just one half of FIG. 4B is used, the half created by the web's leading edge being generally more stable because the trailing edge may involve disturbing air turbulences and a negative pressure at the trailing edge seems to disturb the stability of measurement more than a positive pressure at the leading edge. As shown in FIG. 4B, when the sensor goes in under the overlap zone 3, the derivative function has a sign which is opposite to what it is when the sensor comes out from under the overlap zone 3.

The sensor 4 is able to retain its working condition for some time even without being coated, but it is generally preferable to cover the sensor 4 with a suitable coating or protective skin. In the event that friction between a web and the roll 1 is sufficiently low by virtue of air lubrication, the roll surface speed and the web speed need not be equal. The roll may even rotate in opposite direction. This supports strongly the hypothesis that a tension within the overlap zone 3 of the roll 1 remains constant, since the roll 1 does not produce any lengthwise force on the web 2 as the layer of air between the roll and the web eliminates friction almost completely. Since it is a dynamic force which is measured by an EMFi-film, the roll must be moved for the film to experience a tension-related pressure change. It is possible that a suitably coated roll be functional, even if its speed is not the same as the speed of a web, and this does not cause any significant measuring error. One way of taking advantage of this aspect is, for example, such that, during the run-up or web feeding of an off-line machine, the roll is driven at a web speed, but when a sufficient web speed for providing air lubrication is reached, the roll speed will be maintained constant, thus eliminating the errors caused by changes in the rotating speed of a roll and enabling the reading of a sensor always at the same sample frequency, and accelerations applied to the roll surface and a contact time and a contact-making speed between the web and the sensor being always the same, and sampling moments can also be standardized with higher precision. This improves the reproducibility of measurement at various web speeds with respect to a roll operating at the web speed.

In the event that the roll is small in diameter with respect to length, it may be preferable to divide the sensor 4 into segments. This can be done, for example, by integrating several sensor segments on a single thin flexible circuit board substrate and by setting a pattern of conductors on the circuit board for conveying the measuring signals to the end face of a roll. A suitable circuit board substrate is for example a thin polycarbonate film. By using common conductors at the junctions of successive sensor segments, for example, four sensor segments can be measured using five conductors. If this method is used, each sensor must be individually capable of fitting completely under the overlap zone. Thus, for a 90-degree overlap zone, for example, the four sensor segments together must be less than 360 degrees provided that the sensors are on the same ribbon. This results in a steeper incidence angle of the sensor and thereby improves a lateral resolution of the web. On the other hand, this configuration requires the presence of four measuring amplifiers or AD-converters, or a multiplexer which is controlled for example by an angular sensor to always obtain data from the active sensor. The arrangement of separate sensors may be other than in succession as long as each of the sensors is individually capable of providing the required function.

The sensor signals can be supplied for example in such a way that the sensors have their preamplifiers mounted on the end of a roll and rotating together with the roll. This makes it possible to conduct signal processing prior to conveying the signal from the vicinity of a roll to further processing. Data transmission may also take place in a wireless manner or, for example, in modulated or previously digitized mode, whereby, for example, high-maintenance drag brushes are not needed, except possibly for the transfer of operating voltage to measuring electronics. In terms of electronics, the EMFi-film is high in sensitivity and the film sensor is fully protected electrically, i.e. the signal-to-noise ratio is good. The speed demand of digital data processing depends on a web speed and a required resolution. Resolution crosswise to the web depends also on the ribbon sensor's 4 angle of incidence with the web and on the width of the ribbon. The narrower the ribbon 4 and the more perpendicular the incidence angle between the ribbon and the web 2, the higher resolution is achievable as long as the sampling rate is sufficient with respect to the rotating speed of a roll 1.

The sensor 4 is preferably planted under a coating. Since, in practice, the sensor has a thickness of about 400 micrometers and has its edges rounded, the sensor can be temporarily used also on top of a coating or in association with an uncoated roll 1. In this case, the sensor 4 may have a shorter service life but, on the other hand, for example in the purpose of fault finding, the sensor can be installed quickly by using wireless data transfer. It is true that the measuring accuracy may be slightly compromised by a bulging sensor, since the sensor itself may cause friction between the web and the roll. Of course, an unprotected sensor fixed directly to a roll is only applicable for temporary measuring. On the other hand, even as a temporary solution, the method is very expedient when compared to available technology and provides more accurate results. In practice, the addition of any other similar measuring device to an existing paper web is often impossible.

A highly suitable protective coating for the sensor is a ceramic resin composite coating with a high lubricity and smoothness. An example of such a coating is the ARC S2® coating marketed by A. W. CHESTERTON CO. As a thin and elastic surface, this is a highly durable and hard coating. In conducted tests, the coating proved excellent in its practical properties. Since the coating is relatively thin, the sensor will form a slight bulge but the coating is able to sustain the stress and is lubric and wear-resistant. This solution is durable in practice, ensures a high sensitivity for the sensor, yet protects the sensor well against wearing.

Other convenient coatings include a stocking-like cover, yet it should be kept in mind when using a heat-shrinkable stocking that the sensor is not highly resistant to heat. The sensor location can be protected for the duration of heating by covering it with a thermal insulation. Consequently, the stocking shrinks elsewhere and tightens up also at the location of a sensor. The bottom face of a shrinking stocking is often provided with a heat-setting adhesive.

Figure 5A:
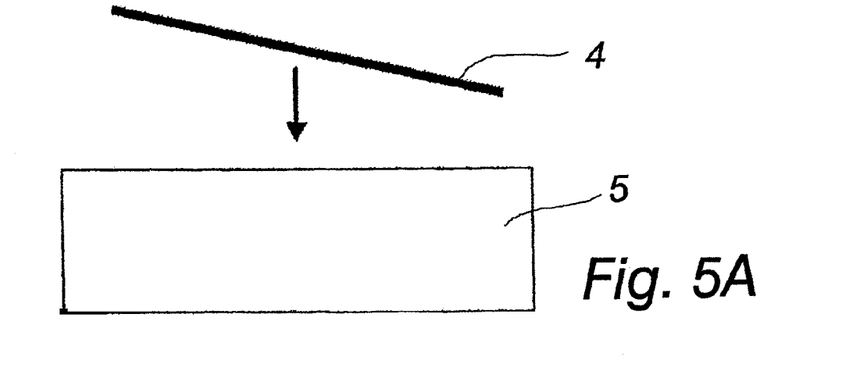
FIGS. 5A-5C: installation of a sensor on a roll by means of a mounting film.
Figure 5B:
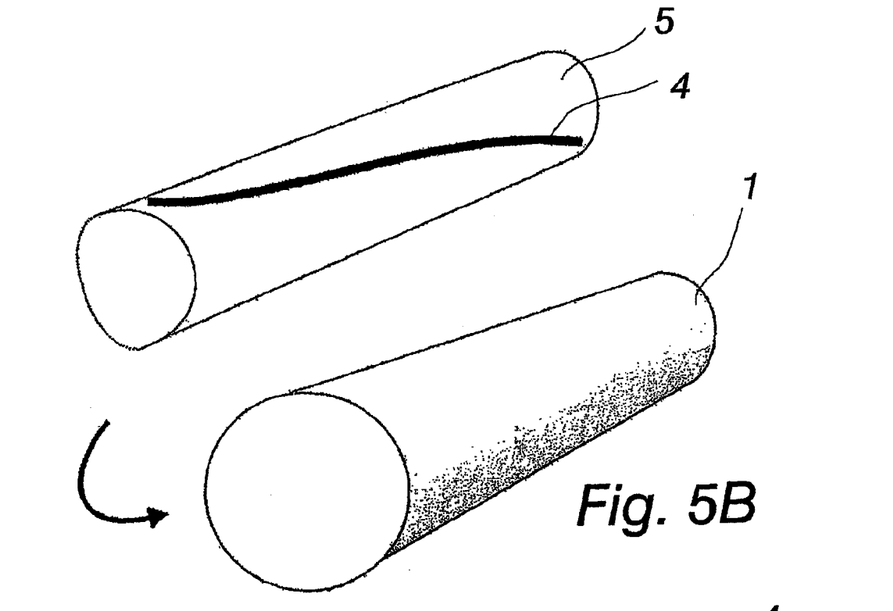
Figure 5C:
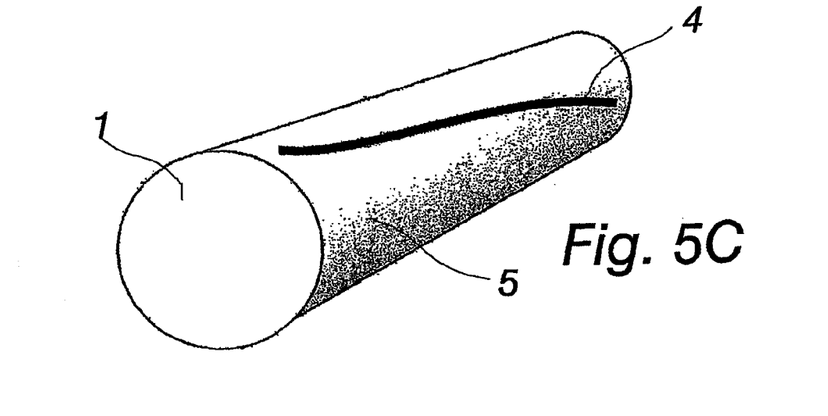

FIGS. 5A-5C illustrate a type of installation, in which the sensor is first secured to a film 5 or a stocking 5, which is retrofitted on top of a roll. Since the sensor 4 can thereby be planted on the film 5 along a flat surface, as shown in FIG. 5B, particularly the installation of a spirally shaped sensor will be more convenient and precise than the installation thereof directly on a roll, because the sensor has a straightforward planting line and the planting can be performed in a roomy space in advance.

The film can be a seamless stocking 5 and the stocking 5 may have a number of sensors 4 on its surface in a symmetrical arrangement. The film may also be suitable for sizing or welding, preferably the film is shrinkable either by heating it or, for example, in response to a chemical reaction. The chemical reaction can be produced, for example, by a reaction between two film layers, by "painting" the film with a suitable solvent or hardener, by painting a roll with a heat-sensitive hardener, whereby heating of the roll releases a material that produces a shrinking and/or sizing reaction in the film.

Because the film can be made symmetrical and consistent in thickness, the roll needs no balancing after the planting of a sensor. The sensors can be planted on the stocking at an angle set in advance with dimensional precision and the installation around a roll itself is quick and easy. The planting of several sensors is just as easy as that of a single sensor. The effect of a sensor-influenced bulge on the web can be mitigated also by planting several sensors or physically sensor-emulating strips, such that there are always a number of bulges under the overlap angle, and as one bulge emerges from under the overlap angle, another bulge proceeds to go in under the overlap angle at the same location when viewed in a lateral direction of the web.

The method enables conducting sporadic tension profile measurements at the customer's facility, whereby said method can be used to replace an air-cushion based tension bar. Measuring accuracy is improved. A stocking-like sensor can be fixed on top of any roll material and, if the surface is damaged, a replacement of the stocking is a low-cost and quick procedure.

The film suitable for retrofitting can be an elongate two-layer ribbon, which is wound around a roll. In this case, the sensor itself is buried under several layers of film. The two-layer film can have such a design that the layers react to each other and tighten around the roll upon curing. A corresponding method is used, for example, for protecting cable junctions from water by using a curing two-layer tape. Prior to winding on top of the junction, the tape is adhesive-less and only winding of the tape, such that different layers react to each other, results in the tape shrinking and the layers adhering firmly to each other for a watertight solid layer.

In conducted tests, the measuring method provided reliable relative results regarding a tension profile of the web 2. An absolute profile must be calculated by using values measured in another way, by scaling the profile using overall web tension and web width. One of the tests involved e.g. modifying the tension profile of a profile by wetting a web which had dried along the edges. Since the measuring method provides a result in real time over every revolution of the roll 1, said method is suitable in terms of controlling a regulation device. The control of a steam box or spray was tested with promising results. Furthermore, in terms of web feeding, the method is suitable for measuring the location and tension of a leader, thus enabling the measurement of the location and tension of a narrower-than-web leader 2 via an apparatus or method of the present invention. This enables a quick and simple measurement, which reveals not only the location of a web feeding leader but also its width, tension profile and overall tension.

The above-mentioned helical measuring sensor, fitting completely under an overlap angle, is excellent in terms of measuring indirectly a nip-pressure influenced change in web tension and thereby measuring indirectly the nip pressure. This enables the measurement of a lateral nip pressure and, via feedback, an adjustment of the nip pressure.

A papermaking line comprises several nips, from which a measurement of the nip pressure profile is not readily achievable with available sensor technology. In paper finishing calenders, for example, the roll temperatures can be significantly in excess of 100 degrees. In addition, the calenders involve a very high nip load. In press section nips, in film size presses or in film transfer coating, the level of force may also exceed the holding capacity of a pressure-sensitive film sensor and, hence, the sensor cannot be applied in all instances for measuring a direct nip load. In addition, the rolls of presses, for example, are often provided with a rubber surface and therefore, due to the curing of rubber, the nip roll cannot be fitted with film sensors of presently available technology.

However, the nip pressure is a source of strains in a nip and the effect thereof can be measured by measuring a change in web tension. This provides an indirect way of measuring the nip forces of a calender or the like.

It has been discovered that in soft-surface rolls, for example in a film transfer press or a sizer, the length of a nip, and thereby the speed existing in the nip, is affected by the magnitude of a line load through the displacement of a roll coating material. Respectively, the tension profile upstream of the nip is affected by variations of the line load profile at various points crosswise of the web. If, for example, the nip has a stronger bearing effect at its ends, the nip and web speed is at its highest along the edges and thereby the effect of the nip on tension profile is such that the web tightens along the edges. The condition is typical for example in connection with a film transfer press.

What happens with hard-surface rolls, for example in the nips of a supercalender, is that most stretching of the web occurs where the highest nip load is present. Thus, tension is reduced in these sections. This provides data for example about supercalender nips. A measuring sensor planted according to the invention is relatively easy to install, especially along with a stocking as described above, on the rolls between calender nips.

This provides a method of measuring a change of tension profile caused by a nip load by measuring the nip-influenced change in tension. As pointed out, the direction of a change depends on the roll coating. Said result is also affected by changes caused by other factors. The effect of the latter can be alleviated by conducting several measurements, in which the effects of a nip or other factors are varied, or by measuring tension next to a nip and at a machine-directed distance from a nip, the difference between these measurements displaying the effect of the nip.

Hence, the effect of a nip is manifested as a change of tension profile and thus the nip pressure can be measured indirectly by measuring a change in web tension caused by a strain in the web resulting from a nip pressure and by a strain of the nip coating itself A sensor planted as described above is expedient for such measurement, because it is easy to plant in an existing device, nor does it take extra space for example in a calender, in which it may be found inconvenient to accommodate measuring devices, for example a measuring bar.

The measurement and calibration of a nip effect can be conducted at least in three different ways as follows:

A first mode of measuring a nip pressure comprises measuring a web tension profile upstream and downstream of a calender nip, as shown in the preceding figure, preferably by applying an on-line tension profile measurement according to the invention based on a helical measuring sensor. This is followed by calculating a difference profile from the discussed tension profiles. The difference profile depends on a type of effect resulting from a nip profile plus other factors. Hence, this enables determining indirectly the shape of a nip effect, which can be narrowed down to the shape of a nip profile which cannot be measured directly from the nip because of difficult conditions of the calender. Of course, factors contributing to a change in tension include not only a nip profile but also temperatures, moistures, web properties, etc., so what is defined in practice is a sort of identification type of profile, which reveals the effect of a nip profile plus other factors by way of tension. By conducting, in addition to tension measurement, response tests with steam boxes, induction heaters, and the like, some of the effect of the latter can be eliminated from the overall identification profile for defining more clearly the shape of a nip profile alone.

A second option comprises measuring a tension profile just before a nip, which enables measuring a tension profile which includes the nip effect, and also at a substantial distance before a nip, e.g. upstream of any holding point where no nip effect is observed on the tension profile. The effect of a nip on the tension profile is at its maximum immediately before the nip and dwindles when proceeding upstream of the web. When proceeding sufficiently far towards the wet end to measure a tension profile, the effect of a nip on tension is no longer in evidence, resulting in a tension profile free of nip effect (for reference). This is followed by calculating a difference profile from these two measurements, which can be further used for determining the line pressure profile of a nip as long as the properties and/or overall force of the nip are known.

A third option comprises measuring first a tension profile using a nip-preceding guide/unwinder roll with the nip open and then with the nip closed and calculating a difference profile, which reveals how tension is affected by the nip closing and consequently by a line load profile and the like factors. By measuring a nip-influenced tension profile at several nip pressures, information is also obtained regarding at least a difference between line load profiles produced by various nip loads, because at this point the only tension-affecting factor, after the closing of a nip, consists of speed variations in the web resulting from the nip pressure.

Embodiments of the invention are applicable for soft calenders and generally for calenders. By way of the above second option, embodiments of the invention can also be used in connection with film transfer coating. In a calender, confirming the functionality of eliminating the effect of steam boxes and other variables calls for practical tests for modelling the effect of each factor.

Figure 6:
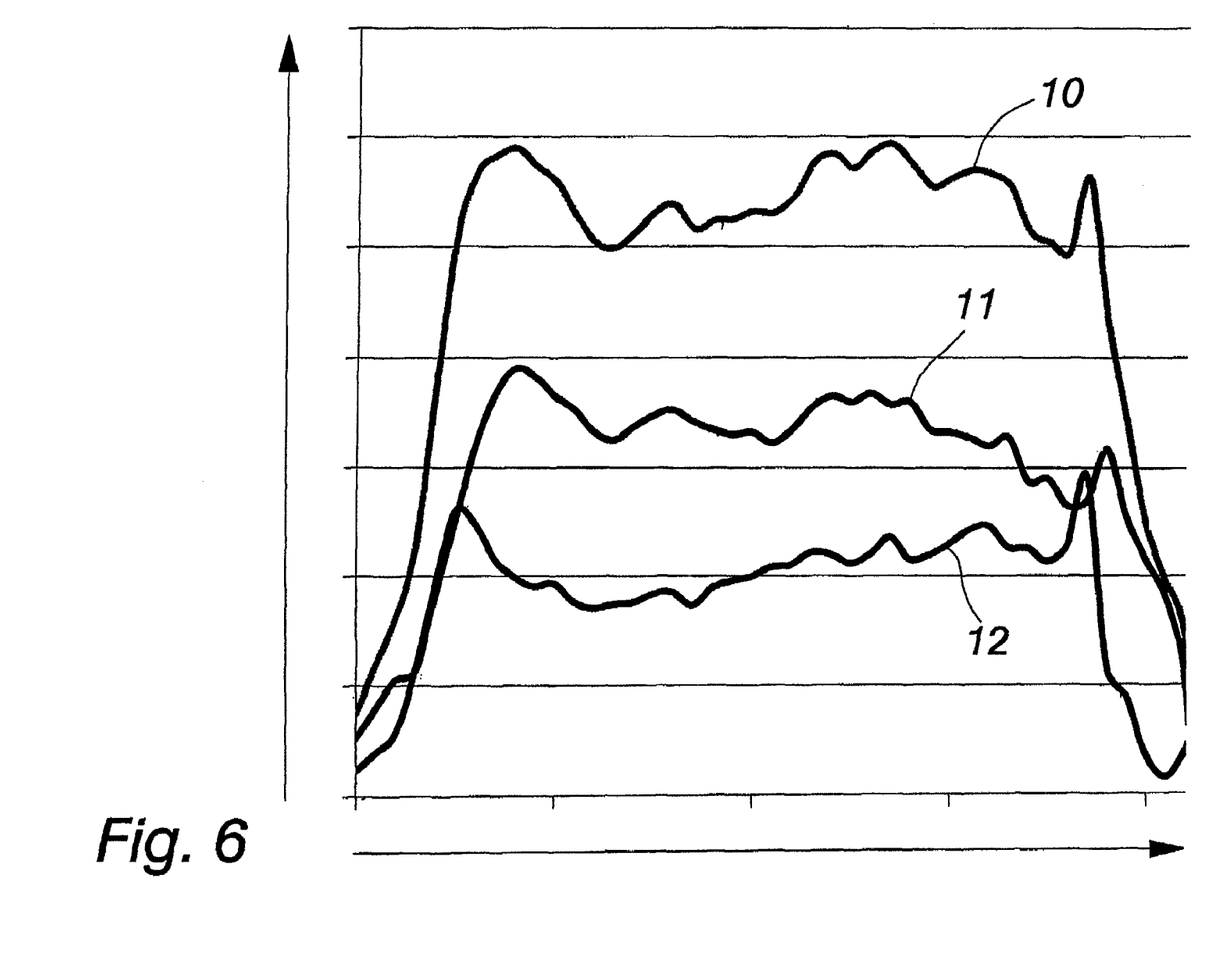
FIG. 6: a measuring result of nip action in a diagrammatic representation.

FIG. 6 shows one indicative measurement, illustrating how a web tension profile is affected by closing the nip of a film transfer press. The nip of this particular film transfer press is bearing at its edges, i.e. the nip load has a "laughing" profile due to deflection of the rolls. The effect of a nip load profile (plus crownings, etc.) shows in a difference plot 12. A graph 10 is the graph for an open nip, a graph 11 represents a closed nip, and a difference is represented by the graph 12. Thus, what is represented by a graph is how much more web tension is added by the nip and, since the film transfer press has a soft coating, an increased tension corresponds to an increased line load. Preferably, it is possible to adjust for example the nip load of a film transfer press or a soft-surface calender and to measure the change of tension profile as a function of the nip load. The load profile of a crowned roll can thus be optimized as desired, for example the loading of a roll can be selected in such a way that the crowning provides a consistent bearing, or the properties of a paper web can be regulated better as information is obtained about the nip load profile.

In a soft-surface nip, as mentioned above, the change imposed on a tension profile by the strain of a coating exceeds those caused by the strains of a fibrous web or paper itself. Thus, the measurement is a relatively convenient and reliable indication of relative variations in a nip load profile. The overall loading is easier to measure, so the relative variations in a nip load profile can be used for calculating also an absolute line load profile. The compression of coatings and a speed variation caused thereby can be modelled also separately by measuring a speed variation instead of a tension profile.

In addition to the web tension in a paper machine, a preferred field of application relates also to controlling the web tension in printing presses. In a printing press, the web is cut for several strips. The cut divisional webs are guided for routes designated therefor (formers, folders, a bundling press) using turning bars. The turning bars are non-rotating hollow dead-ended tubes with air blasting holes in the shell thereof. A web proceeding over the turning bars is supported on top of a pneumatically formed air cushion. The amount of blast air from turning bars is regulated visually by printing press operators, such that the divisional webs sort of like hover above the bar surfaces. In a printing press, the web tension is measured and adjusted between an unwinder and an RTF roll assembly. Downstream of the RTF roll assembly, the next holding point is at the variable-speed nip rolls of a former following the turning bars.

A significant portion of web breaks occurring in a printing press result from runnability problems over turning bars. Lengthwise changes in the tension profile of customer reels cause trouble in the passage of a divisional web over a turning bar. The turning bars have but one optimal blast pressure at which the web travels in a stable manner. The most important running parameters in terms of a proper blast pressure comprise web tension, running speed, and air permeance of printing paper. The properly adjusted blast pressure of a turning bar is not sufficient, with the tension of a divisional web increasing, to develop an air film between the turning bar and the divisional web, which leads to mechanical attrition and a web break. Respectively, as the tension of a divisional web decreases, the divisional web begins flapping because of excessive blast and leads to a web break.

At present, the pressure adjustment of turning bars is effected manually, which is why the turning bars require active tracking and the adjustment requires an experienced operator. Because of manual adjustment there is no capability of responding to high-speed lengthwise web tension/profile variations. In addition to runnability problems at the tail end of a printing press, the errors in tension profile impede the focusing of pixels in printing units.

According to one embodiment of the invention, an EMFi-film sensor is used for measuring the tension profile of a web on a roll coated with a tension measuring bar or a profile measuring sensor. A sufficient accuracy for profile measurement is the width of divisional webs, e.g. about 21 cm in A4 printing. This allows for a simple and inexpensive tension profile measurement. The tension profile measurement and the running speed are used as a basis for regulating the blast pressures of turning bars. The blast pressure needed for air impermeable paper grades is calculated by a formula $p=T/r$, wherein T=web tension and r=bar radius. As for air permeable paper grades, another factor to be considered is running speed.

Pressure regulation for the blast air of turning bars is effected with presently available printing press actuators by modifying the same to become automated closed-loop regulators. In addition to those used earlier, the newly adopted printing press control parameters include a measured tension profile, a roll-specific air permeance and a grammage. The system can also be augmented with computer intelligence, making the regulating system self-learning such that preset blast pressures are determined from roller-specific data on the basis of previously printed rollers.

In addition, the tension and path length of divisional webs in a printing press can be adjusted on the basis of a measurement after cutting the web for divisional webs (e.g. size A4). The tension/path length of these divisional webs can be modified for controlling tensions of the divisional webs regardless of each other. A tension measuring roll of the invention can be used for tension measurement, enabling measurement of the tension of each divisional web regardless of the others and enabling use of the result for automated regulation of the bars. Tension of the divisional webs can also be concluded by measuring the tension profile, prior to cutting into divisional webs, from a full-width web by dividing the full-width measuring profile into a tension profile coinciding with the location of each divisional web.

Another preferred application is a slitter at the back of a paper machine. The web is unwound from a full-width machine roll, cut for divisional webs and wound on cardboard cores for customer reels, e.g. for delivery to a printing house. Used between slitting and winding is a measuring roll of the invention, which discriminates not only the tension profile but also the tension level of each divisional web. If necessary, the tension level of a divisional web can be adjusted e.g. using movable rolls/bars, thus changing the distance traveled by various divisional webs between two different holding points. Alternatively, it is possible to measure the tension profile of a full-width web and to divide it for sections consistent with divisional webs, for example based on the positional data of slitting knives. Since the tension profile measured before a slitting operation largely remains even after the slitting operation, the measurement can be used for predicting the post-slitting behaviour of divisional webs and for a subsequent adjustment of the printing press web in accordance with the measured profile data set.

The divisional-web or roller-specific measuring signal of a slitter can be utilized in controlling the runnability of the slitter between slitting and winding. In addition, it is possible to form and store each reeled-up customer reel with a tension profile contained therein. It is possible to utilize this data later and e.g. to subsequently adjust the printing press process according to the roller's profile data set or to select roller suitable for each printing process in terms of the tension profile thereof That which is claimed:

1. A method for measuring a lateral tension profile of a fibrous web, comprising:
    placing at least one pressure-sensitive film sensor on a roll in a helical configuration with respect to a surface thereof;
    covering the at least one pressure-sensitive film sensor with a covering selected from group consisting of a coating over the roll and a tubular protective skin placed over the roll; and
    measuring a force exerted by the web on the roll using the at least one pressure-sensitive film sensor, the roll having the web wrapped at least partially thereabout such that contact therebetween defines an overlap angle, the at least one pressure-sensitive film sensor having at least one active zone for measuring the force exerted by the web, the at least one pressure-sensitive film sensor being further configured to be disposed substantially completely within the overlap angle during a first portion of each revolution of the roll, and then substantially completely within an open space on the surface of the roll, outside the overlap angle, during a second portion of each revolution of the roll.

2. A method as set forth in claim 1, wherein the at least one pressure-sensitive film sensor comprises a plurality of sensors engaged with a single ribbon, and the method further comprises helically contacting the surface of the roll with the single ribbon such that each of the plurality of sensors is capable of measuring the force exerted by the web on the roll.

3. A method for measuring a lateral tension profile of a fibrous web, comprising:
    engaging at least one pressure-sensitive film sensor with a covering selected from the group consisting of a protective film and a tubular stocking;
    placing covering on a roll such that the at least one pressure-sensitive film sensor is disposed in a helical configuration with respect to a surface of the roll; and
    measuring a force exerted by the web on the roll using the at least one pressure-sensitive film sensor, the roll having the web wrapped at least partially thereabout such that contact therebetween defines an overlap angle, the at least one pressure-sensitive film sensor having at least one active zone for measuring the force exerted by the web, the at least one pressure-sensitive film sensor being further configured to be disposed substantially completely within the overlap angle during a first portion of each revolution of the roll, and then substantially completely within an open space on the surface of the roll, outside the overlap angle, during a second portion of each revolution of the roll.

4. A method as set forth in claim 1, further comprising placing the at least one pressure-sensitive film sensor in a protection groove defined by the surface of the roll.

5. A method as set forth in claim 1, wherein the surface of the roll is smooth, and the method further comprises placing the at least one pressure-sensitive film sensor on top of the surface of the roll.

6. A method as set forth in claim 1, wherein the at least one pressure-sensitive film sensor further comprises an EMFi film sensor.

7. A method for controlling a web of a printing press, comprising:
    measuring a lateral tension profile of a fibrous web by measuring a force exerted by the web on a roll using at least one pressure-sensitive film sensor disposed in a helical configuration in contact with a surface of the roll, the roll having the web wrapped at least partially thereabout such that contact therebetween defines an overlap angle, the at least one pressure-sensitive film sensor having at least one active zone for measuring the force exerted by the web, the at least one pressure-sensitive film sensor being further configured to be disposed substantially completely within the overlap angle during a first portion of each revolution of the roll, and then substantially completely within an open space on the surface of the roll, outside the overlap angle, during a second portion of each revolution of the roll; and
    actively regulating air pressure of turning bars of the printing press in response to the measured lateral tension profile.

8. A method for controlling a tension profile of a web, comprising:
    measuring a lateral tension profile of a fibrous web by measuring a force exerted by the web on a roll using at least one pressure-sensitive film sensor disposed in a helical configuration in contact with a surface of the roll, the roll having the web wrapped at least partially thereabout such that contact therebetween defines an overlap angle, the at least one pressure-sensitive film sensor having at least one active zone for measuring the force exerted by the web, the at least one pressure-sensitive film sensor being further configured to be disposed substantially completely within the overlap angle during a first portion of each revolution of the roll, and then substantially completely within an open space on the surface of the roll, outside the overlap angle, during a second portion of each revolution of the roll; and adjusting a tension profile regulator, the tension profile regulator comprising at least one of a spray nozzle and a steam box, in response to the measured lateral tension profile.

9. A method for characterizing a nip, comprising:

measuring a lateral tension profile of a fibrous web as set forth in claim 1, determining a change in the lateral tension profile of the web due to strain exerted on the web by a nip; and determining at least one of a shape and a size of a nip line pressure profile from the lateral tension profile change.

10. A method as set forth in claim 9, further comprising determining a line pressure profile by determining the lateral tension profile of the web for at least two nip pressures.

11. A method for feeding a web, comprising:

measuring a lateral tension profile of the web by measuring a force exerted by the web on a roll using at least one pressure-sensitive film sensor disposed in a helical configuration in contact with a surface of the roll, the roll having the web wrapped at least partially thereabout such that contact therebetween defines an overlap angle, the at least one pressure-sensitive film sensor having at least one active zone for measuring the force exerted by the web, the at least one pressure-sensitive film sensor being further configured to be disposed substantially completely within the overlap angle during a first portion of each revolution of the roll, and then substantially completely within an open space on the surface of the roll, outside the overlap angle, during a second portion of each revolution of the roll, so as to provide a determination selected from the group consisting of an identification of a location of a ribbon having the at least one pressure-sensitive film sensor wherein the ribbon is narrower than the web, and a measurement of at least one of a tension profile, a tension, and a width of the ribbow; and at least one of adjusting a tension of a web feeding leader by varying at least one of a speed and momentum of the roll, and adjusting a tension of a web feeding rope by varying an electrical drive of a rope pulley.

12. An apparatus for measuring a tension profile of a web, comprising:

a pressure-sensitive film sensor disposed in a helical configuration on a surface of a roll, the pressure-sensitive film sensor being configured to obliquely contact the web wrapped at least partially about the surface of the roll such that contact therebetween defines an overlap angle, the pressure-sensitive film sensor being further configured to extend co-directionally with the web about the surface of the roll for no greater than the overlap angle so as to be capable of measuring a lateral tension profile of the web; and a protective layer covering the pressure-sensitive film sensor.

13. An apparatus as set forth in claim 12, further comprising a plurality of pressure-sensitive film sensors successively disposed about the surface of the roll, each pressure-sensitive film sensor being configured to extend co-directionally with the web about the surface of the roll for less than the overlap angle.

14. An apparatus as set forth in claim 12, wherein the surface of the roll defines a protective groove configured to receive the pressure-sensitive film sensor.

15. An apparatus as set forth in claim 12, wherein the surface of the roll is smooth and the pressure-sensitive film sensor is disposed on top of the surface of the roll.

16. An apparatus as set forth in claim 12, wherein the pressure-sensitive film sensor further comprises an EMFi pressure-sensitive film sensor.

* * * * *